(12) United States Patent
Aron et al.

(10) Patent No.: US 9,336,132 B1
(45) Date of Patent: May 10, 2016

(54) METHOD AND SYSTEM FOR IMPLEMENTING A DISTRIBUTED OPERATIONS LOG

(75) Inventors: Mohit Aron, Los Altos, CA (US); Brian Byrne, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 225 days.

(21) Appl. No.: 13/367,073

(22) Filed: Feb. 6, 2012

(51) Int. Cl.
*G06F 12/00* (2006.01)
*G06F 11/20* (2006.01)
*G06F 12/02* (2006.01)
*G06F 12/08* (2016.01)

(52) U.S. Cl.
CPC ........ *G06F 12/0238* (2013.01); *G06F 11/2056* (2013.01); *G06F 12/0246* (2013.01); *G06F 12/08* (2013.01); *G06F 2212/222* (2013.01); *G06F 2212/286* (2013.01)

(58) Field of Classification Search
CPC . G06F 12/08; G06F 12/0238; G06F 12/0246; G06F 11/2056; G06G 2212/222; G06G 2212/286

See application file for complete search history.

(56) References Cited

U.S. PATENT DOCUMENTS

| | | | |
|---|---|---|---|
| 8,255,739 B1 * | 8/2012 | Chatterjee et al. | 714/6.1 |
| 8,601,473 B1 | 12/2013 | Aron et al. | |
| 8,660,991 B2 * | 2/2014 | Glaude | 707/652 |
| 2006/0004957 A1 * | 1/2006 | Hand | G06F 12/0866 711/113 |
| 2007/0168630 A1 * | 7/2007 | Hirakawa et al. | 711/162 |
| 2010/0199036 A1 * | 8/2010 | Siewert et al. | 711/112 |
| 2011/0320733 A1 * | 12/2011 | Sanford et al. | 711/135 |
| 2013/0132674 A1 * | 5/2013 | Sundrani | 711/122 |

* cited by examiner

*Primary Examiner* — Aracelis Ruiz
(74) *Attorney, Agent, or Firm* — Vista IP Law Group, LLP (57) ABSTRACT

Disclosed is an improved approach for implementing a storage system having an operation log where data writes are initially performed to a fast operation log, rather than to its permanent storage location. A distributed operation log can be employed to replicate the data to multiple locations in the storage system.

42 Claims, 12 Drawing Sheets

METHOD AND SYSTEM FOR IMPLEMENTING A DISTRIBUTED OPERATIONS LOG

FIELD

This disclosure concerns write operations for storage devices.

BACKGROUND

There are many kinds of architectures that can be used to implement storage systems. Traditionally, storage for a computing system is implemented using directly attached or integrated storage, such as hard disk drives that are commonly integrated into personal computers. Distributed storage architectures are also widely used, to allow a computer to access and store data on networked based storage devices.

Modern computing systems may also implement storage in the context of virtualization environments. A virtualization environment contains one or more "virtual machines" or "VMs", which are software-based implementations of a machine in a virtualization environment in which the hardware resources of a real computer (e.g., CPU, memory, storage, etc.) are virtualized or transformed into the underlying support for the fully functional virtual machine that can run its own operating system and applications on the underlying physical resources just like a real computer. By encapsulating an entire machine, including CPU, memory, operating system, storage devices, and network devices, a virtual machine is completely compatible with most standard operating systems, applications, and device drivers. Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Storage devices comprise one type of a physical resource that can be managed and utilized in a virtualization environment. A set of one or more virtual disks may be implemented to allow virtualize storage of data on behalf of one or more clients, such as client computers, systems, applications, or virtual machines, where the virtual disk (or "vdisk") is actually a logical representation of storage space compiled from one or more physical underlying storage devices. When the client issues a write request or read request in a virtualization system, that request is actually issued to a virtualized storage device.

When certain commands are issued by a client to a storage tier, it is often expected that some sort of "commitment" or 'commit" must occur before an acknowledgement is provided back to the client to indicate successful processing of that command. For example, consider a "write" command that is issued by a client to write a data item to a storage tier in a storage system. After the write command has been issued, the client will be placed into a holding state to wait for a message (or some other indication) that the write command has been successfully processed, which is based upon the data item being persistently placed somewhere within the storage tier. This acknowledgement message is often necessary to ensure that a commit of the data has actually occurred, so that the client can safely proceed with further processing. The persistent writing of the data item is often desired to ensure that the occurrence of a subsequent failure will not result in the loss of data.

The issue is that requiring a commit to occur before allowing the client to further proceed with its processing could cause an undue amount of perceptible delay at the client. This could create a significant amount of unwanted latency. This problem could be even more problematic in a distributed or virtualized system, where there are many kinds of underlying storage devices in the storage tier having differing levels of storage performance. This problem is further exacerbated if there is a need to perform some sort of data replication to provide storage redundancies.

Therefore, there is a need for an improved approach to implement storage which addresses these and other problems with the existing storage systems.

SUMMARY

Embodiments of the present invention provide an improved approach for implementing a storage system. In some embodiments of the invention, data writes are initially performed to a fast operation log, rather than to its permanent storage location. However, this initial write to the fast operation log permits enough persistence such that a subsequent failure will not result in the loss of that data. As such, the confirmation message for the client can be immediately sent to the client. This approach provides significant and nontrivial reductions with respect to delays and latency, increasing the performance of the storage system. Over time, the data in the fast operation log can be flushed to slower back-end storage devices. A distributed operation log can be employed to replicate the data to multiple locations in the storage system.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an improved approach for implementing a storage system. In some embodiments of the invention, data writes are initially performed to an operation log at a fast storage layer, rather than to its permanent storage location. However, this initial write to the fast operation log permits enough persistence such that a subsequent failure will not result in the loss of that data. As such, the confirmation message for the client can be immediately sent to the client. This approach provides significant and nontrivial reductions with respect to delays and latency, increasing the performance of the storage system. Over time, the data in the fast operation log can be flushed to back-end storage devices. A distributed operation log can be employed to replicate the data to multiple locations in the storage system.

Figure 1:
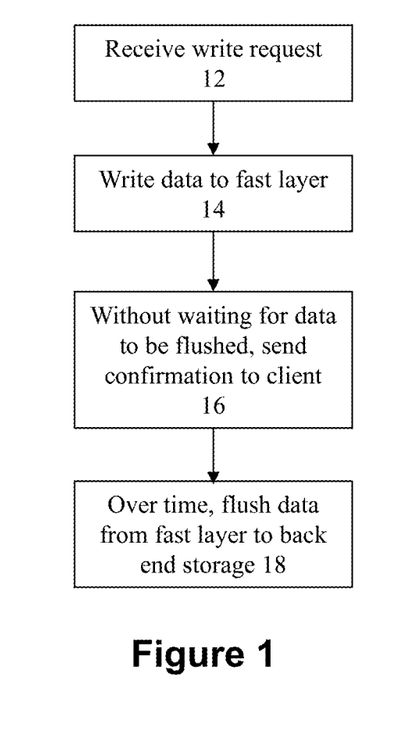
FIG. 1 shows a flowchart of an approach for implementing an operation log according to some embodiments of the invention.

FIG. 1 shows a flowchart of an approach for implementing an operation log according to some embodiments of the invention. The process begins at 12 when the storage system receives a write request. The request may be any type of request to write data to the storage system. For example, the write request could be directed to writing of actual data items to one or more storage locations in the storage system, e.g., writes to extents, disks, and/or vdisks. In addition, the write requests may also be directed to the writing of metadata pertaining to the storage system.

At 14, the data item is written to a fast layer within the storage system, rather than to back-end storage that is the intended target location of the data item. For example, consider if the intent of the write request is to write to an extent on a given disk or vdisk. The disk or vdisk may correspond to a back-end physical storage such as disk drives. However, writing to this type of back-end storage may result in unacceptable latencies for the performance of the storage system. Therefore, an operation log in a fast storage layer may be implemented using faster storage devices, such as for example, Solid State Drives ("SSDs"). At 14, instead of immediately writing to the back-end storage devices, the data items is instead written to the operation log in the much faster SSD device.

At this point, the data item has not yet been written to its intended location in the back-end storage devices. However, since the data has been written to a persistent location on the SSD, the write has been "committed" enough such that, at 16, a confirmation of the write request can be returned to the client. Since this confirmation is being sent after writing has occurred to the fast layer (e.g., the SSD), this means that from the perspective of the client, only a very small latency period was required for performing this write operation. This latency period is much smaller than the alternative approach where the confirmation has to wait for a commit to occur to the slower back-end storage devices. The client can then proceed with its subsequent operations.

Meanwhile, the data that has been placed into the fast storage layer can be flushed to the back-end storage devices over time (18). As the data for the write operations are committed to the back-end, the corresponding data in the fast operation log is discarded.

Figure 2A:
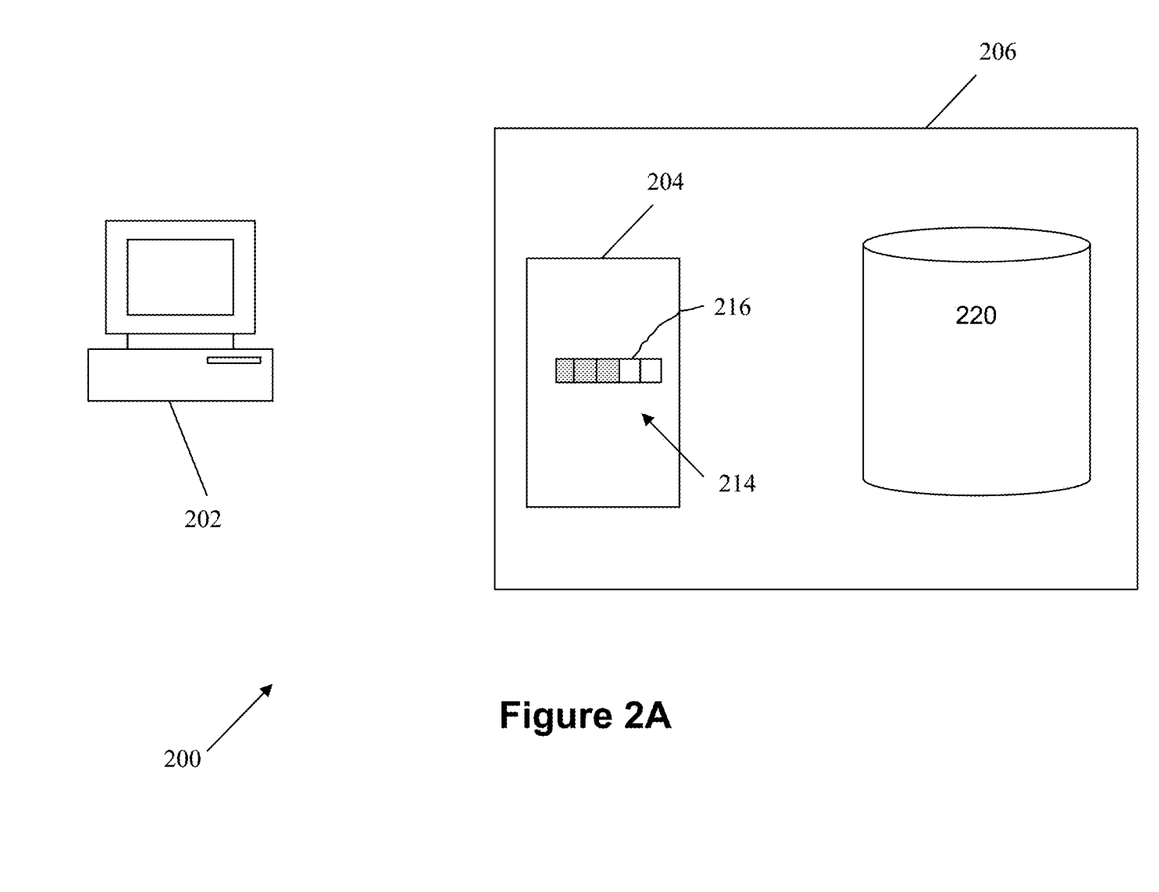
FIGS. 2A-E illustrate implementation of an operation log according to some embodiments of the invention.

This process is illustratively shown in FIGS. 2A-E. FIG. 2A shows a system 200 that includes one or more clients 202 that operate the system 200 to storage and access within a storage system 206. Client 202 comprises any type of computing station that may be used to operate or interface with storage system 206. Examples of such clients 202 include, for example, workstations, personal computers, remote computing terminals, laptop computers, tablet computers, mobile telephones and/or electronic reading devices. Client 202 comprises a display device, such as a display monitor, for displaying data and control interfaces to users at the client 202. Client 202 also comprises one or more input devices for the user to provide operational control over the activities of system 200, such as a mouse, keyboard, or touchpad to manipulate an object in a graphical user interface.

Storage system 206 comprises an architecture for implementing storage management. For the purposes of illustration, the following explanation is provided in the context of storage system 206 implemented in a virtualization environment. As such, storage system 206 comprises back-end storage 220 that is implemented as virtual disks or vdisk. The back-end storage 220 (implemented as virtual disks) refers to a storage abstraction that is exposed by the virtualized storage system 206 be used by the client 202, where the client 202 may be a virtual machine instead of a physical client device. It is noted, however, that the inventive concepts disclosed herein are not limited to virtualization systems, and may be applied to non-virtualized storage systems as well. Therefore, the invention is not to be limited in its application to virtualization systems unless claimed as such.

Storage system 206 further comprises a fast storage layer 204. In some embodiments, the fast storage layer 204 comprises fast storage devices, such as SSDs, that are directly attached to a network node being accessed by the client 202.

Figure 2B:
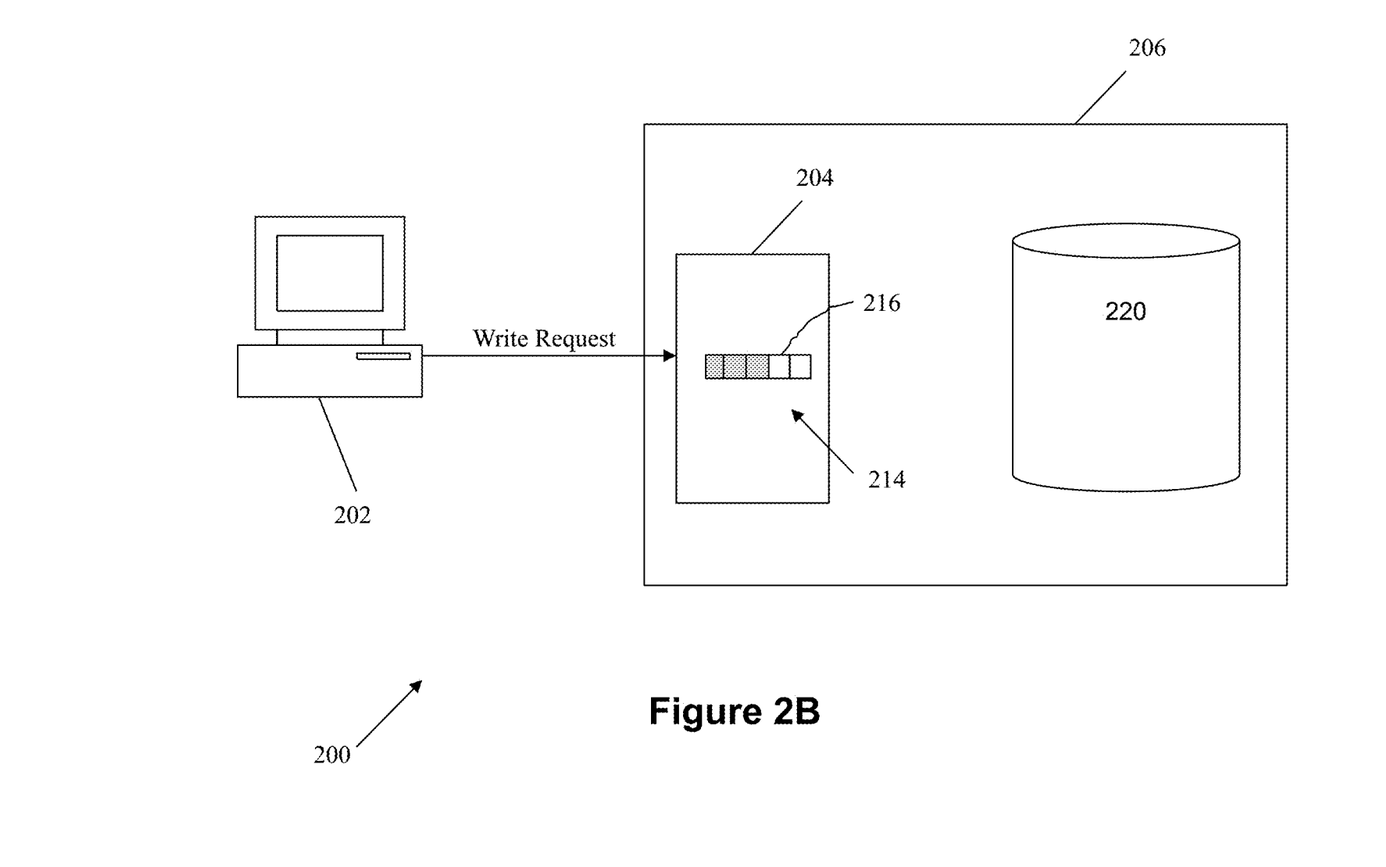

FIG. 2B illustrates the situation where the client issues a write request to write a given data item to the back-end storage 220. Instead of directly sending that write request to the back-end storage 220, the write request is instead initially handled by the fast storage layer 204.

Figure 2C:
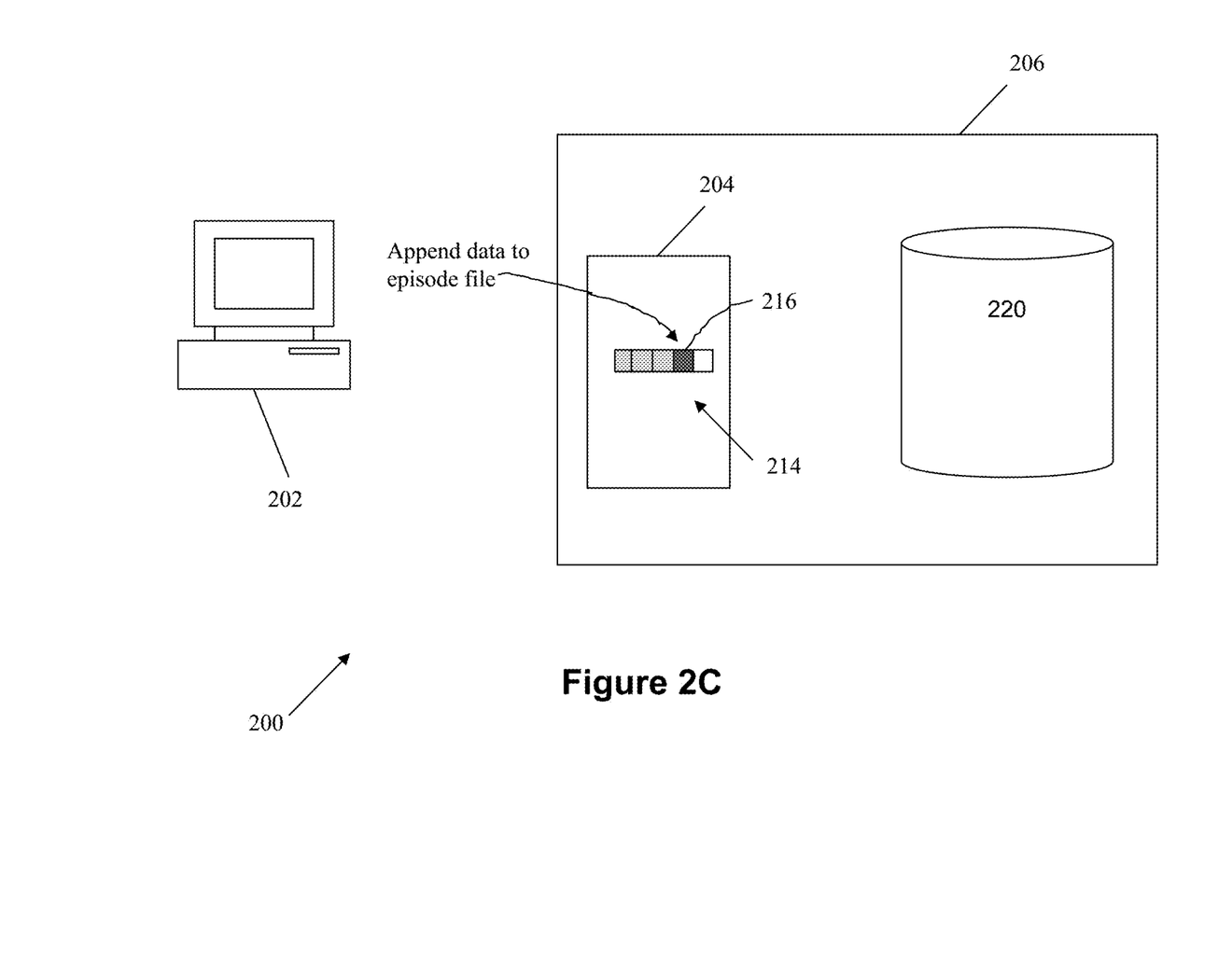

As shown in FIG. 2C, the data is initially saved to an operation log on the fast storage layer 204. In some embodiments, writes to the operation log on the fast storage layer 204 are created as contiguous time ranges referred to herein as "episodes". Each episode corresponds to a log file that includes all writes for a given range of time. Each succeeding write to an episode file will append to the data already within that episode file. For example, if the current episode file 214 in the example of FIG. 2C already includes previously written data items in locations 215, then the data item for the current write request will be appended to location 216 that immediately follows previous locations 215.

Every episode is assigned a monotonically increasing value, referred to herein as an "episode sequence". Writes for an individual episode will all be stored in the same logical file on SSD. When space on the SSD 204 is later reclaimed after being flushed to the back-end 220, the space will be reclaimed on an episode by episode basis.

A fixed amount of space will be reserved on the SSD exclusively for the operation log. If the reservation limit is met, writes will be forced to stall until space can be cleared on the device. Alternatively, if the write-receiving host's SSD reservation is met, it may offload the request to another host's SSD. In some embodiments, latency insensitive approaches may write to second-tier SSD or disk to if high performance SSD space is tight.

Figure 2D:
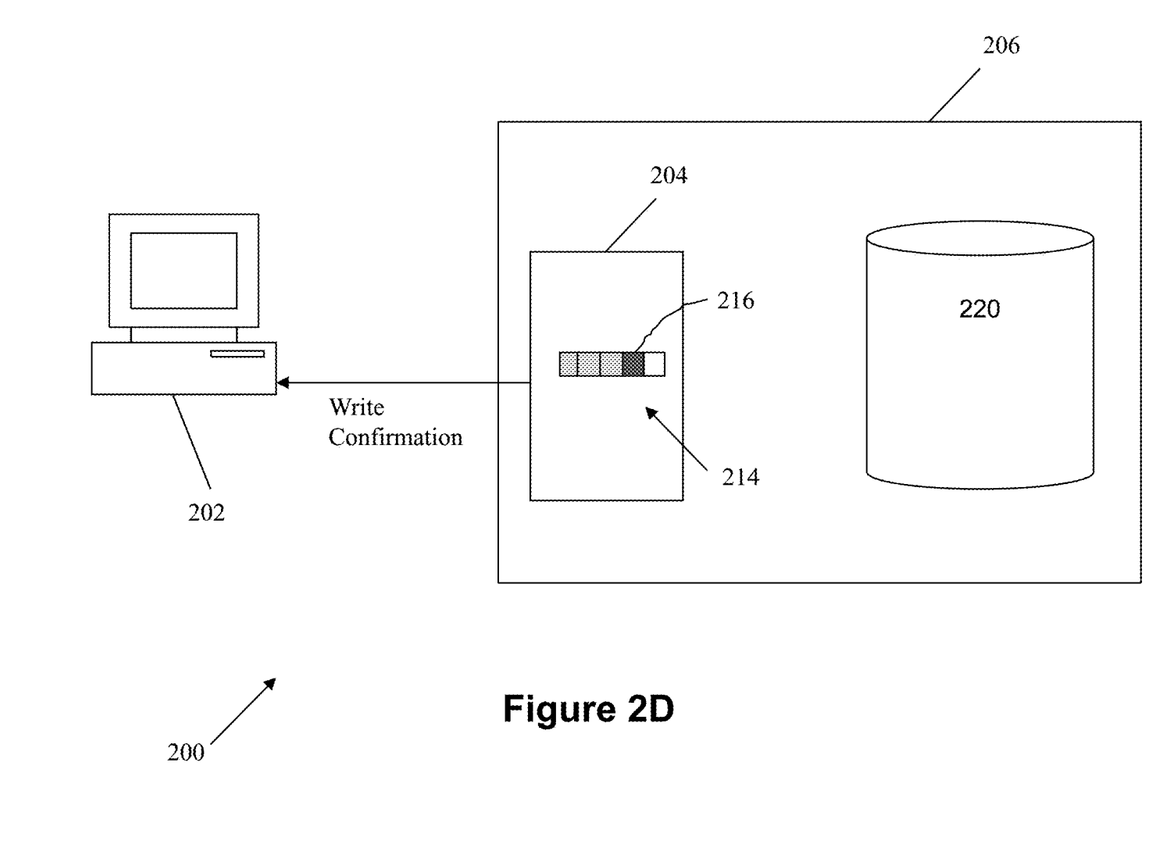

Once the data has been written to the SSD 204, then a write confirmation can be returned to the client 202, as shown in FIG. 2D. This write confirmation can be sent to the client 202 even though the data has not yet been committed to the back-end 220.

Figure 2E:
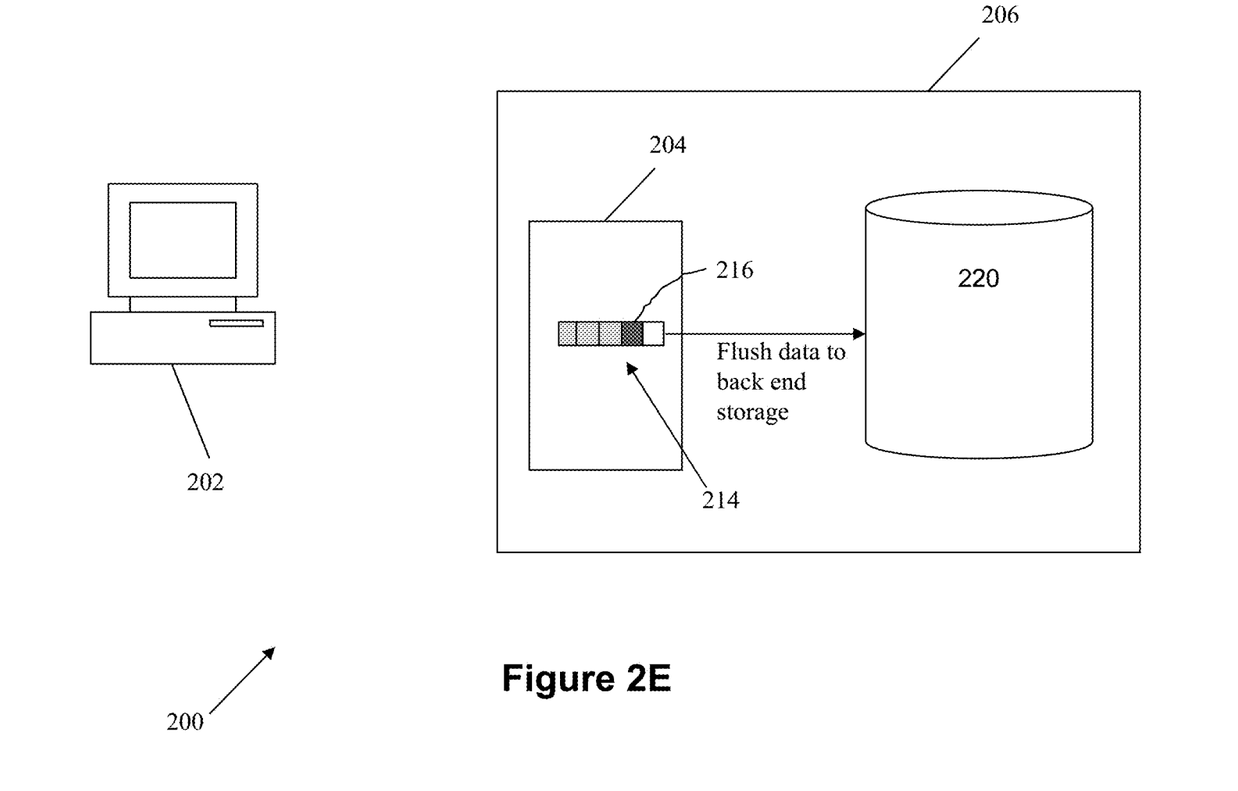

As illustrated in FIG. 2E, the data within the SSD 204 can be flushed to the back-end 220 at a later point in time. This means that the performance of the storage system 206 is greatly improved, since only minimal latency will be perceived by the client 202. The latency overhead will no longer include any latency dues to the commitment of the data to the back-end 220. Instead, the perceived latency at the client will only include low overhead latency relating to instruction processing (such as remote procedure call ("RPC") costs) and small persistence costs for persisting data to high performance SSDs.

The addition of the fast storage layer will also serve to improve data access response times as well for the storage system 206. This is because any data requested by client 202 which exists on the fast storage layer 204 can be retrieved and provided to the client 202 very quickly. To quickly serve new requests, an in-memory index can be maintained at the fast storage layer 204 to track about all outstanding record writes. For example, the index can be configured to track the specific region that a record covers for a vdisk, the episode sequence the record belongs to, and the record's offset into its episode file.

Another embodiment of the invention implements a distributed operations log that provides fault tolerance in the event of a node failure. Since it is possible that the virtual disks are not permanently bound to a single server, a vdisk may encounter data loss in the event of a failure of the host for the vdisk. Therefore, the operation log can be implemented in a distributed manner so that no isolated failure can cause data loss and/or corruption.

The distributed operation log is implemented by replicating the journaled data to multiple nodes in the storage system. By providing this replication, the necessary fault tolerance now exists to maintain data availability even in the event of a failure.

Figure 3:
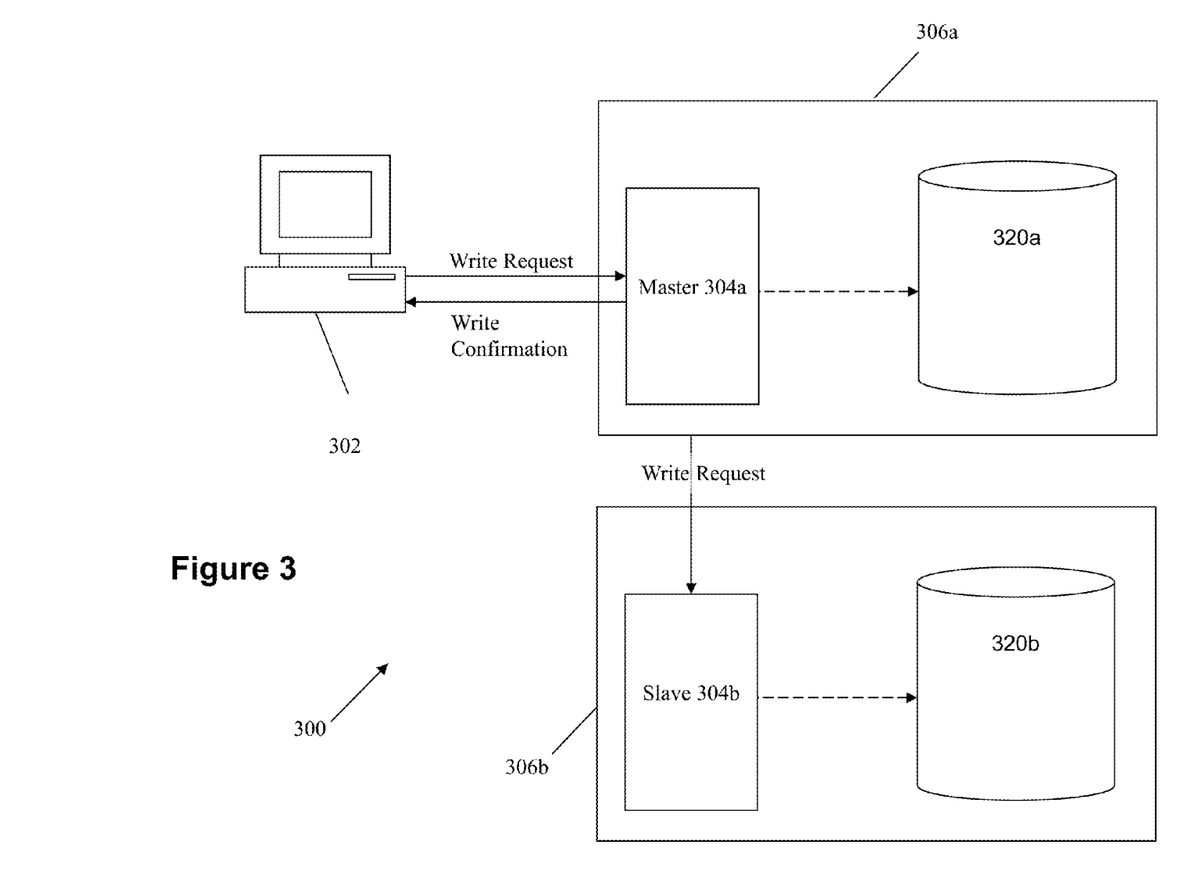
FIG. 3 illustrates implementation of a distributed operation log according to some embodiments of the invention.

FIG. 3 illustrates a system 300 that implements this aspect of the current embodiment, where the operation log is implemented as two separate subcomponents. A primary operation log 304a is provided, which is written to by the process-local node 306a to the client 302. There will be one or more slave operation logs 304b that are located on remote nodes 306b.

The primary operation log 304a is the component responsible for committing all writes to persistent storage. Like the previously described embodiment, write requests that are generated by the client 302 are handled by the node 306a by initially writing the data to the primary operation log 304a and then sending the write confirmation back to the client 302 without requiring the data to be immediately committed to the back-end storage 320a.

With the distributed operation log approach, the data written to the primary operation log 304a will also be replicated to the slave operation log 304b. This way, if a failure occurs to node 306a, then the data can be recovered and used from the slave operation log 304b. In some embodiments, the slave operation log 304b exists exclusively for replication and recovery purposes, and therefore does not carry through the replicated writes for their corresponding vdisk 320b. In an alternative embodiment, the replicated writes are stored to the vdisk 320b from the slave operation log 304b.

Figure 4A:
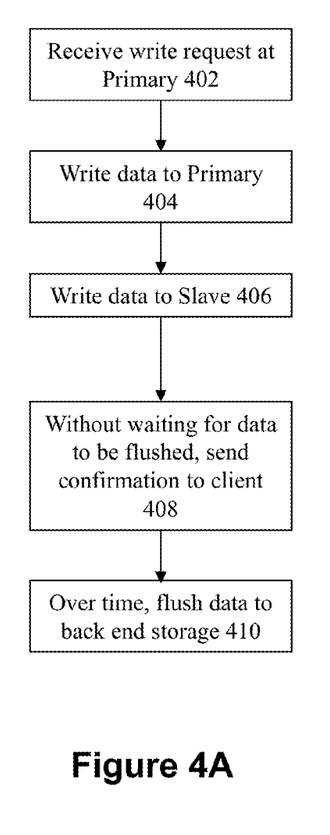
FIGS. 4A-B show flowcharts of approaches for implementing a distributed operation log according to some embodiments of the invention.

FIG. 4A shows a flowchart of an approach for implementing a distributed operation log according to some embodiments of the invention. The process begins at 402 when the master storage system receives a write request. At 404, the data item is written to the fast storage layer associated with the primary operation log. At 406, the data item is replicated to the fast storage layer associated with the salve operation log. In both actions, instead of immediately writing to the back-end storage devices, the data is instead written to the respective operation logs in much faster SSD devices.

At this point, the data item has not yet been written to its intended location in the back-end storage device(s). Nevertheless, at 408, since the data has been written to a persistent location on the SSD, the write has been "committed" enough such that a confirmation of the write request can be returned to the client. Since this confirmation is being sent after writing has occurred to the fast layer (e.g., the SSD), this means that from the perspective of the client, only a very small latency period now exists for performing this write operation. This latency period is larger than the previously described approach since additional latency is incurred to replicate the data to the slave operation log.

Over time, the data in the distributed operation logs can be flushed to the back-end storage. As noted above, in some embodiments only the vdisks on the primary node will have the data eventually written to those vdisks. As the data for the write operations are committed to the back-end, the corresponding data in both the primary and slave operation logs will be discarded.

Figure 4B:
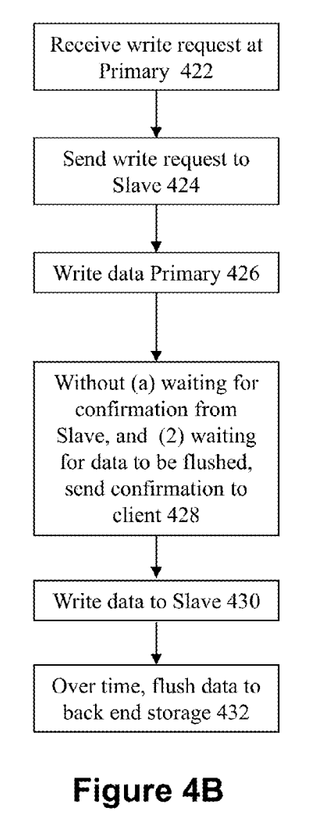

FIG. 4B shows a flowchart of an alternate approach for implementing a distributed operation log which serves to reduce latency associated with the replication operation. As before, the process begins at 422 when the master storage system receives a write request. At 424, the replicated write request is sent to the slave operation log. At 426, the data item is written to the fast storage layer associated with the primary operation log.

The key difference for the present embodiment is that, instead of waiting for confirmation from the slave operation log that the data has been replicated, the primary operation log will optimistically assume that the replication is successful. Therefore, at 428, if (1) the data has been successfully written to the primary operation log; and (2) the write request to replicate the data has already been sent to the slave operation log, then the write confirmation is immediately sent to the client. The replicated write operation to the slave operation log may or may not have actually completed by that point in time. In some cases, at 430, the replicated write operation may in fact actually be completed after the write confirmation has already been sent to the client at 428.

At this point, the data item has not yet been written to its intended location in the back-end storage device(s). Over time, the data in the distributed operation logs can be flushed to the back-end storage (432). As noted above, in some embodiments only the vdisks on the primary node will have the data eventually written to those vdisks. As the data for the write operations are committed to the back-end, the corresponding data in both the primary and slave operation logs will be discarded.

In some embodiments, the distributed operation log may be implemented over any number of slave operation logs to address any level of fault tolerance that may be desired. To reduce latency to the absolute minimum, the data may not be replicated (i.e., there are zero slave operation logs). For an environment that seeks increased security for its data, there may be multiple slave operation logs. Many environments may be satisfied by implementing just a single slave operation log.

In addition, the locality of the different operation logs may be configured to address different fault tolerance concerns. For example, an administrator may wish to implement replicas of the data to span multiple different storage appliances. In addition, the different appliances may be selected on the basis of having differing fault criteria to ensure that a single failure event will not result in failures of both the primary and slaves (e.g., by placing the primary and the slave into different power domains or geographic locations).

The kind of data may be a factor in how the data is replicated. For example, local replication may be suitable to handle temporary data, whereas highly valuable data may require higher levels of fault tolerance guarantees.

The commit response required for the replication may also be adjusted to meet performance expectations. For example, two possible approaches that can be utilized for replicate commits are in-memory or non-volatile commits. The in-memory replication commit achieves the quickest response turnaround. However, in the event of a server crash, the most recent replica operation log writes may be lost. It is noted that since the replica operation log writes are persisted, this controls when the response is returned. The nonvolatile responses approach differs in that it requires the data to be persisted before replying to the primary.

To meet performance expectations, the distributed operation log approach should be implemented to be efficient in terms of latency and performance, since the distributed operation log has the potential to be a bottleneck for clients since it potentially blocks writes until sufficient persistence can be guaranteed. However, the distributed replication introduces latency into the system and slow servers may diminish the operation log's performance. For this reason, some embodiments will implement the following: (1) store data on high performance SSDs in the fast storage layer, where a fixed amount of space is reserved for every hosted vdisk exclusively for the operation log. If, at any time, the reservation limit is met, writes will be forced to stall until space can be cleared on the device. Alternatively, latency insensitive vdisks may write to second-tier SSD or disk to if high performance SSD space is tight (as mentioned above, writes may also be placed on a remote host's SSD if the local one is full). (2) Expedite duplication requests from other operation logs. The operation log exists in the write path and internal locks may be held for the vdisk. Therefore, it may be beneficial to give the replication request a higher priority higher; and (3) Not be statically restricted to defined operation log slaves. That is, replica operation log replicas should be mutable. In the event that an oplog replica is slow, a new one can be chosen to store subsequent new writes.

As noted above, writes to an operation log in some embodiments are made to contiguous time ranges in the form of episodes. With distributed operation logs, writes for a given episode are replicated to the exact same set of operation log slaves. That is, if a new collection of slaves is required (which may be due for example to low disk space on a slave, or slow behavior), then the latest episode is frozen (turned into read-only) and a new collection of operation log slaves are chosen to handle the new episode's writes. Only the latest created episode is mutable for a given vdisk. However multiple episodes may exist for an operation log at any given time. The operation log deletes an old episode only when all of the writes for that episode have been persisted to the back-end. Therefore, it may be the case that a new episode is generated for the purpose of removing flushed episodes, since episode files can only be deleted all at once.

In some embodiment, the operation log slaves can be chosen using a ring system or an automatic selection criterion. In an alternate embodiment, the operation log slaves are heuristically chosen by a primary operation log. This approach may be advantageous under certain circumstances, since by enabling the primary to select the replicas heuristically, it may better satisfy the requirements for the operation log and it may simplify recovery since the primary would know exactly which node/slave holds the replica in the event of a need to recover state. In addition, this approach may make it easier to switch to new operation log replicas. This is because the primary operation log can control the point in time when the new replica operation log is chosen, and therefore may flush necessary data before making the transition. In some embodiments, the operation log slaves are chosen based primarily on available SSD capacity. It is assumed in some embodiments that all operation log slaves are equally efficient and fast to reach via a network, and therefore distributed loads can be implemented by looking at SSD capacities.

Figure 5:
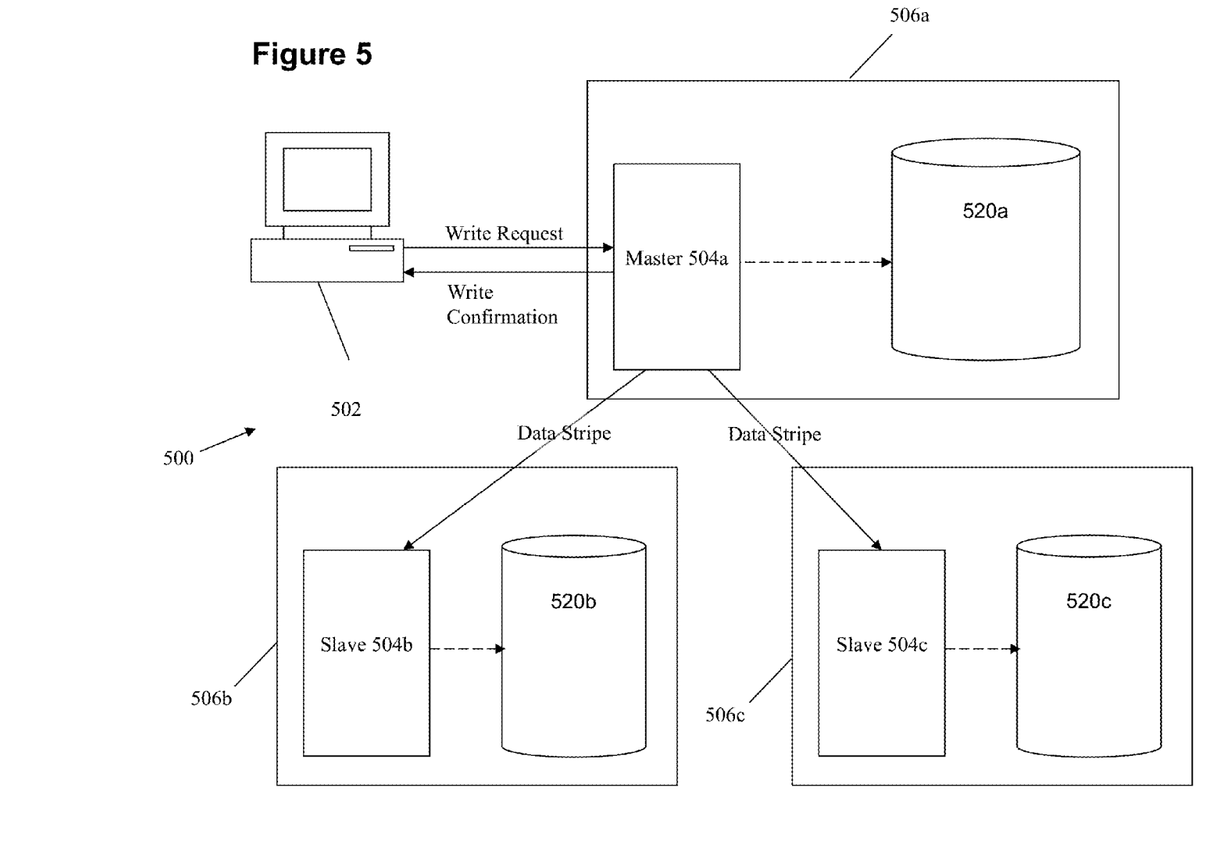
FIG. 5 illustrates a distributed operation log with striping according to some embodiments of the invention.

As illustrated in FIG. 5, data striping may be utilized in some embodiments of the invention to increase throughput and performance. In this approach, data may be striped across multiple operation log slaves 504*b* and 504*c*. The added benefit of this approach is that the workload can be distributed across more than one server. This is because heavily loaded primary operation logs will burden operation log slaves with the same intensity. However, data striping allows the same replica burden to be shared across multiple slave nodes.

One possible disadvantage to striping data records is that a full recovery of the primary operation log may requires all operation log slaves to be operational. However, a downed replica may only require a subset of the data from the primary.

In yet another approach, multi-server fault tolerance can be implemented by splitting writes into two parts and distributing them to different operation log slaves. A third replica operation log would receive the parity of the two halves. This provides dual server failure (e.g., can still recover if the primary and a replica operation log die) with reduced bandwidth and storage overhead for the same fault tolerance (1.5× vs. 2× in the doubly-replicated case), at the expense of contacting all three operation log slaves per write.

Figure 6:
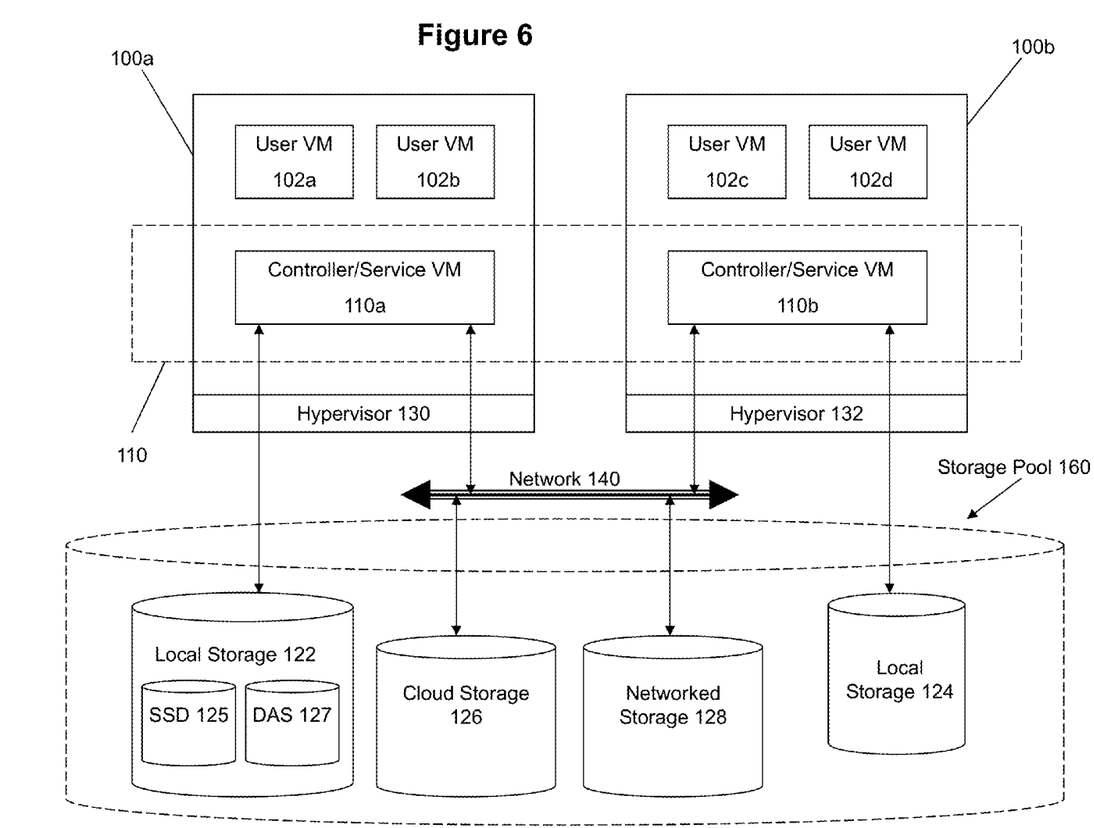
FIG. 6 illustrates an example architecture to implement I/O and storage device management in a virtualization environment according to some embodiments of the invention.

The invention may be advantageously employed in any suitable storage architecture. For example, FIG. 6 illustrates an example architecture for implementing storage management in a virtualization environment that may be used in conjunction with embodiments of the invention. The architecture of FIG. 6 can be implemented for a distributed platform that contains multiple servers 100*a* and 100*b* that manages multiple-tiers of storage. The multiple tiers of storage include storage that is accessible through a network 140, such as cloud storage 126 or networked storage 128 (e.g., a SAN or "storage area network"). The architecture also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM" or "Service VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Further details regarding an exemplary approach to implement the architecture of FIG. 6 are described in co-pending U.S. application Ser. No. 13/207,345, filed on Aug. 10, 2011, entitled "ARCHITECTURE FOR MANAGING I/O AND STORAGE FOR A VIRTUALIZATION ENVIRONMENT", which is hereby incorporated by reference in its entirety.

System Architecture

Figure 7:
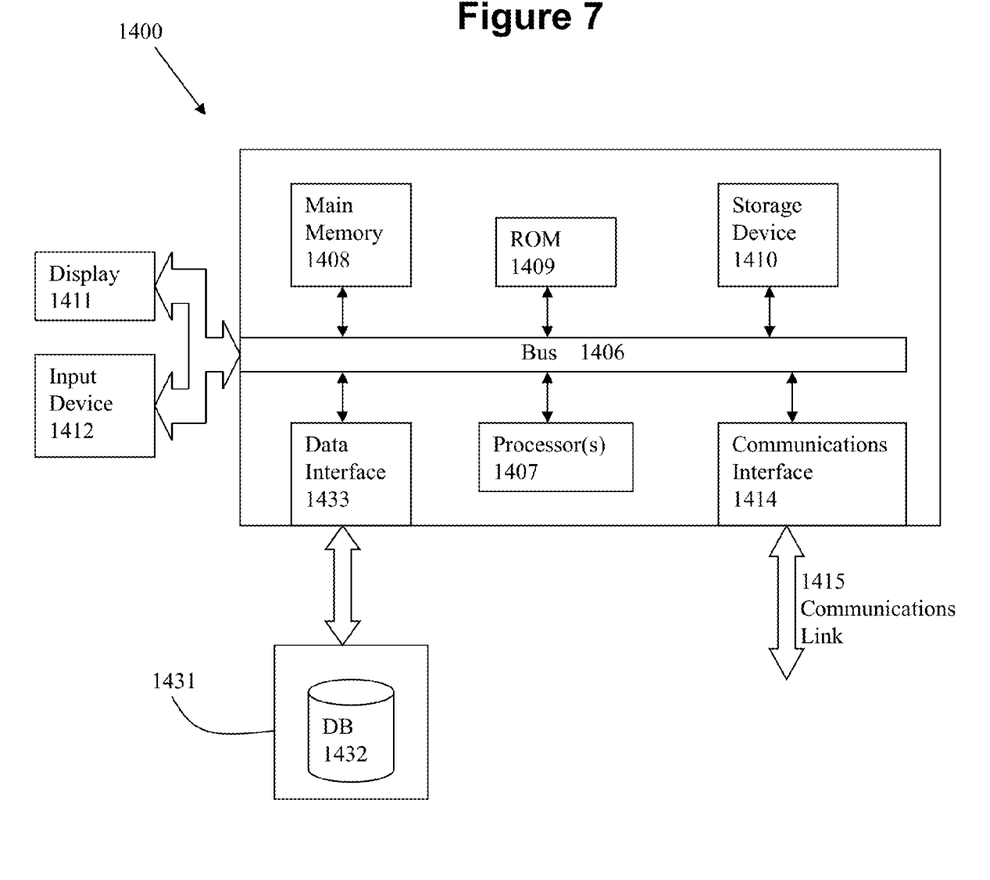
FIG. 7 is a block diagram of a computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for managing storage devices, comprising:
receiving, at a first node, a write request to write data to a relatively slow back-end storage tier in a storage system, the storage system further comprising a relatively fast storage tier comprising SSDs;
initially writing the write request to write data to the relatively slow back-end storage tier as temporary data to a first operation log on the first node at the relatively fast storage tier, the temporary data being distributed across multiple nodes by replicating the first operation log on the first node to one or more other operation logs on other nodes based on a replication factor;
sending a confirmation of the write request to an originator of the write request at a point in time where data to be committed in the write request has not been committed to the relatively slow back-end storage tier; and
transferring contents of the operation log to the relatively slow back-end storage tier.

2. The method of claim 1, in which the data is written to the relatively slow back-end storage tier after the confirmation of the write request is sent to the originator of the write request.

3. The method of claim 2, in which the data is written to the relatively slow back-end storage tier over time.

4. The method of claim 2, in which the data in the operation log is deleted after the data has been written to the relatively slow back-end storage tier.

5. The method of claim 1, in which the data in the operation log are created as a log having a contiguous time range of the data.

6. The method of claim 5, in which a succeeding write to the log is appended to existing data in the log.

7. The method of claim 1, in which an in-memory index is maintained to track about all outstanding record writes.

8. The method of claim 1, in which the first operation log comprises a primary operation log on a first node and the one or more other operation logs comprise a slave operation log on a second node, the slave operation log being a replicated form of the primary operation log so that the primary operation log and the slave operation log contain the same write requests.

9. The method of claim 8, in which the primary operation log is responsible for committing writes to persistent storage and the slave operation log comprises a replication of the data on the primary log, and wherein the slave operation log comprising the replicated temporary data is configured to replace the primary operation log on the first node upon failure of the primary operation log at the first node.

10. The method of claim 9, wherein replacing the primary operation log comprises using the slave operation log to commit the write request.

11. The method of claim 8, in which the primary operation log on the first node waits for confirmation from the slave operation log before confirming to the originator of the write request.

12. The method of claim 8, in which the primary operation log on the first node does not wait for confirmation from the slave operation log before confirming to the originator of the write request.

13. The method of claim 8, in which the data is striped across multiple slave operation logs.

14. The method of claim 1, in which the storage system comprises a virtualization storage system.

15. A system for managing storage devices, comprising:
a processor;
a memory for holding programmable code; and
wherein the programmable code includes instructions for receiving, at a first node, a write request to write data to a relatively slow back-end storage tier in a storage system, the storage system further comprising a relatively fast storage tier comprising SSDs; initially writing the write request to write data to the relatively slow back-end storage tier as temporary data to a first operation log on the first node at the relatively fast storage tier, the temporary data being distributed across multiple nodes by replicating the first operation log on the first node to one or more other operation logs on other nodes based on a replication factor; sending a confirmation of the write request to an originator of the write request at a point in time where data to be committed in the write request has not been committed to the relatively slow back-end storage tier; and transferring contents of the operation log to the relatively slow back-end storage tier.

16. The system of claim 15, in which the data is written to the relatively slow back-end storage tier after the confirmation of the write request is sent to the originator of the write request.

17. The system of claim 16, in which the data is written to the relatively slow back-end storage tier over time.

18. The system of claim 16, in which the data in the operation log is deleted after the data has been written to the relatively slow back-end storage tier.

19. The system of claim 15, in which the data in the operation log are created as a log having a contiguous time range of the data.

20. The system of claim 19, in which a succeeding write to the log is appended to existing data in the log.

21. The system of claim 15, in which an in-memory index is maintained to track about all outstanding record writes.

22. The system of claim 15, in which the first operation log comprises a primary operation log on a first node and the one or more other operation logs comprise a slave operation log on a second node, the slave operation log being a replicated form of the primary operation log so that the primary operation log and the slave operation log contain the same write requests.

23. The system of claim 22, in which the primary operation log is responsible for committing writes to persistent storage and the slave operation log comprises a replication of the data on the primary log, and wherein the slave operation log comprising the replicated temporary data is configured to replace the primary operation log on the first node upon failure of the primary operation log at the first node.

24. The system of claim 23, wherein replacing the primary operation log comprises using the slave operation log to commit the write request.

25. The system of claim 22, in which the primary operation log on the first node waits for confirmation from the slave operation log before confirming to the originator of the write request.

26. The system of claim 22, in which the primary operation log on the first node does not wait for confirmation from the slave operation log before confirming to the originator of the write request.

27. The system of claim 22, in which the data is striped across multiple slave operation logs.

28. The system of claim 15, in which the storage system comprises a virtualization storage system.

29. A computer program product embodied on a non-transitory computer readable medium, the computer readable medium having stored thereon a sequence of instructions which, when executed by a processor causes the processor to execute a method for managing storage devices, the method comprising:
receiving, at a first node, a write request to write data to a relatively slow back-end storage tier in a storage system, the storage system further comprising a relatively fast storage tier comprising SSDs;
initially writing the write request to write data to the relatively slow back-end storage tier as temporary data to a first operation log on the first node at the relatively fast storage tier, the temporary data being distributed across multiple nodes by replicating the first operation log on the first node to one or more other operation logs on other nodes based on a replication factor;
sending a confirmation of the write request to an originator of the write request at a point in time where data to be committed in the write request has not been committed to the relatively slow back-end storage tier; and transferring contents of the operation log to the relatively slow back-end storage tier.

30. The computer program product of claim 29, in which the data is written to the relatively slow back-end storage tier after the confirmation of the write request is sent to the originator of the write request.

31. The computer program product of claim 30, in which the data is written to the relatively slow back-end storage tier over time.

32. The computer program product of claim 30, in which the data in the operation log is deleted after the data has been written to the relatively slow back-end storage tier.

33. The computer program product of claim 29, in which the data in the operation log are created as a log having a contiguous time range of the data.

34. The computer program product of claim 33, in which a succeeding write to the log is appended to existing data in the log.

35. The computer program product of claim 29, in which an in-memory index is maintained to track about all outstanding record writes.

36. The computer program product of claim 29, in which the first operation log comprises a primary operation log on a first node and the one or more other operation logs comprise a slave operation log on a second node, the slave operation log being a replicated form of the primary operation log so that the primary operation log and the slave operation log contain the same write requests.

37. The computer program product of claim 36, in which the primary operation log is responsible for committing writes to persistent storage and the slave operation log comprises a replication of the data on the primary log, and wherein the slave operation log comprising the replicated temporary data is configured to replace the primary operation log on the first node upon failure of the primary operation log at the first node.

38. The computer program product of claim 37, wherein replacing the primary operation log comprises using the slave operation log to commit the write request.

39. The computer program product of claim 36, in which the primary operation log on the first node waits for confirmation from the slave operation log before confirming to the originator of the write request.

40. The computer program product of claim 36, in which the primary operation log on the first node does not wait for confirmation from the slave operation log before confirming to the originator of the write request.

41. The computer program product of claim 36, in which the data is striped across multiple slave operation logs.

42. The computer program product of claim 29, in which the storage system comprises a virtualization storage system.

* * * * *